(12) United States Patent
Oh

(10) Patent No.: US 8,994,795 B2
(45) Date of Patent: Mar. 31, 2015

(54) METHOD FOR ADJUSTING 3D IMAGE QUALITY, 3D DISPLAY APPARATUS, 3D GLASSES, AND SYSTEM FOR PROVIDING 3D IMAGE

(75) Inventor: Sung-bo Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1028 days.

(21) Appl. No.: 13/044,914

(22) Filed: Mar. 10, 2011

(65) Prior Publication Data
US 2011/0221874 A1    Sep. 15, 2011

Related U.S. Application Data

(60) Provisional application No. 61/312,835, filed on Mar. 11, 2010.

(30) Foreign Application Priority Data

Nov. 8, 2010    (KR) .................. 10-2010-0110498

(51) Int. Cl.
    H04N 13/04    (2006.01)
(52) U.S. Cl.
    CPC ....... *H04N 13/0429* (2013.01); *H04N 13/0497* (2013.01); *H04N 13/0434* (2013.01); *H04N 13/0438* (2013.01)
    USPC ......................................... 348/51

(58) Field of Classification Search
    CPC .......... H04N 13/0429; H04N 13/0434; H04N 13/0497; H04N 13/0438
    USPC .............................. 348/42, 51; 725/39; 710/16
    See application file for complete search history.

(56) References Cited

U.S. PATENT DOCUMENTS

| | | | |
|---|---|---|---|
| 2006/0061652 A1 | 3/2006 | Sato et al. | |
| 2006/0268104 A1* | 11/2006 | Cowan et al. | 348/42 |
| 2007/0040778 A1 | 2/2007 | Karman et al. | |
| 2007/0186015 A1* | 8/2007 | Taft et al. | 710/16 |
| 2011/0225611 A1* | 9/2011 | Shintani | 725/39 |

FOREIGN PATENT DOCUMENTS

| | | |
|---|---|---|
| CN | 1864089 A | 11/2006 |
| CN | 101620321 A | 1/2010 |
| CN | 102164294 A | 8/2011 |
| WO | 01/69944 A2 | 9/2001 |

OTHER PUBLICATIONS

Communication, dated Sep. 27, 2013, issued by the European Patent Office, in counterpart Application No. 11154884.8.

*Primary Examiner* — Allen Wong
(74) *Attorney, Agent, or Firm* — Sughrue Mion, PLLC (57) ABSTRACT

A method for adjusting an image quality of a 3-dimension (3D) image, a 3D display apparatus, 3D glasses, and a system for providing a 3D image are provided. Attribute information of the 3D glasses is acquired from the 3D glasses to adjust an image quality of a displayed 3D image according to the attribute information of the 3D glasses. Therefore, if a viewer views a 3D image through a glasses type 3D display apparatus, brightness of the 3D image is prevented from being darker by 3D glasses or a color hue of the 3D image is prevented from being degraded by the 3D glasses. Accordingly, the viewer views the 3D image with an optimal image quality.

27 Claims, 8 Drawing Sheets

METHOD FOR ADJUSTING 3D IMAGE QUALITY, 3D DISPLAY APPARATUS, 3D GLASSES, AND SYSTEM FOR PROVIDING 3D IMAGE

CROSS-REFERENCE TO RELATED APPLICATION

This application claims priority from U.S. Provisional Application No. 61/312,835, filed on Mar. 11, 2010, in the United States Patent and Trademark Office, and Korean Patent Application No. 10-2010-0110498, filed on Nov. 8, 2010, in the Korean Intellectual Property Office, the disclosures of which are incorporated herein by reference in their entireties.

BACKGROUND

1. Field

Apparatuses consistent with exemplary embodiments relate to a method for adjusting a 3-dimensional (3D) image quality, a 3D display apparatus, 3D glasses, and a system for providing a 3D image, and more particularly, to a method for adjusting a 3D image quality by which left and right eye images are alternately displayed, a 3D display apparatus, 3D glasses, and a system for providing a 3D image.

2. Description of the Related Art 3-dimensional (3D) image technology is applied in various fields such as information communication, broadcasting, medical care, education and training, the military, games, animations, virtual reality, computer-aided design (CAD), industrial technology, etc. The 3D image technology is regarded as core technology of next-generation 3D multimedia information communication which is commonly required in these various fields.

In general, a 3D effect perceived by a human is generated by compound actions of a thickness change degree of a lens caused by changes in a position of an object which is to be observed, an angle difference between both eyes and the object, differences in a position and a shape of the object seen by left and right eyes, a disparity caused by a motion of the object, and other various psychological and memory effects, etc.

Among the above-described factors, a binocular disparity occurring due to a horizontal distance from about 6 cm to about 7 cm between left and right eyes of a human is regarded as the most important factor of the 3D effect. In other words, the human sees an object with angle differences due to a binocular disparity, and an image entering left and right eyes has two different images due to the angle differences. When the two different images are transmitted to the brain of the human through retinas, the brain accurately unites information of the two different images so that the human perceives an original 3D image.

A 3D display apparatus is classified into a glasses type 3D display apparatus which uses special glasses and a non-glasses type 3D display apparatus which does not use special glasses. The glasses type 3D display apparatus uses a color filter method, a polarized light filter method, and a shutter glass method. The color filter method divides and selects an image using color filters which complement each other. The polarized light filter method separates left and right eye images from each other using a shading effect occurring due to a combination of orthogonal polarization devices. The shutter glass method alternately blocks left and right eyes in response to a sync signal for projecting left and right eye image signals onto a screen to provide a 3D effect.

If the glasses type 3D display apparatus is used, a viewer views an image displayed by the glasses type 3D display apparatus through 3D glasses. Here, when a 3D image passes through the 3D glasses, the viewer views an image differently from the 3D image displayed by the glasses type 3D display apparatus. For example, the viewer views an image with brightness that has decreased more than that of an image displayed by the glasses type 3D display apparatus or an image of which color has been distorted.

Here, since a conventional 3D display apparatus sets the same image quality as a 2-dimensional (2D) image quality to output a 3D image with the same image quality as a 2D image, the conventional 3D display apparatus fails to adjust the image quality based on an image quality viewed by the viewer after the viewer wears glasses. Therefore, the viewer views a 3D image which is displayed with a muted color hue on a dark screen.

Accordingly, a method for adjusting a 3D image quality so that a viewer views a 3D image with an optimal image quality although the 3D image passes through 3D glasses is required.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a method for adjusting an image quality of a displayed 3-dimensional (3D) image according to attribute information of 3D glasses acquired from the outside, a 3D display apparatus, 3D glasses, and a system for providing a 3D image.

According to an aspect of an exemplary embodiment, there is provided a method for adjusting an image quality of a 3D image of a 3D display apparatus which is connected to 3D glasses to display the 3D image. The method may include: acquiring attribute information of the 3D glasses; and adjusting the image quality of the displayed 3D image according to the attribute information of the 3D glasses.

The attribute information of the 3D glasses may include at least one of transmissivity of light which passes through the 3D glasses, a contrast change rate of an image which passes through the 3D glasses, a color hue change rate of the image, a clarity change rate of the image, information on a type of the 3D glasses, and information on a manufacturing company of the 3D glasses.

The adjusting may include adjusting the image quality of the 3D image to enhance brightness of the 3D image according to information on the transmissivity of the light which passes through the 3D glasses.

The adjusting may include adjusting the image quality of the 3D image to enhance a contrast ratio of the 3D image according to information on the contrast change rate of the image which passes through the 3D glasses.

The adjusting may include adjusting a color hue of the 3D image to a complementary color of a color hue, which is changed when passing through the 3D glasses according to information on the color hue change rate of the image passing through the 3D glasses, to adjust the image quality of the 3D image.

The attribute information of the 3D glasses may be received from the 3D glasses.

The acquiring may include, if it is determined that a viewer has worn the 3D glasses, acquiring the attribute information of the 3D glasses from the 3D glasses.

The acquiring may include, if it is determined that the attribute information of the 3D glasses has been modified when playing the 3D image, acquiring the attribute information of the 3D glasses from the 3D glasses.

According to an aspect of another exemplary embodiment, there is provided a 3D display apparatus which is connected to 3D glasses to display a 3D image. The 3D display apparatus may include: a display unit which displays the 3D image; a communicator which communicates with an external device to receive attribute information of the 3D glasses; and a controller which adjusts an image quality of the displayed 3D image according to the attribute information of the 3D glasses acquired from the external device.

The attribute information of the 3D glasses may include at least one of transmissivity of light which passes through the 3D glasses, a contrast change rate of an image which passes through the 3D glasses, a color hue change rate of the image, a clarity change rate of the image, information on a type of the 3D glasses, and information on a manufacturing company of the 3D glasses.

The controller may adjust the image quality of the 3D image to enhance brightness of the 3D image according to information on the transmissivity of the light which passes through the 3D glasses, wherein the information is acquired from the communicator.

The controller may adjust the image quality of the 3D image to enhance a contrast ratio of the 3D image according to information on the contrast change rate of the image which passes through the 3D glasses, wherein the information is acquired from the communicator.

The controller may adjust a color hue of the 3D image to a complementary color of a color hue, which is changed when passing through the 3D glasses, according to information on the color hue change rate of the image passing through the 3D glasses, to adjust the image quality of the 3D image, wherein the information is acquired from the communicator.

The communicator may receive the attribute information of the 3D glasses from the 3D glasses.

If it is determined that a viewer has worn the 3D glasses, the communicator may receive the attribute information of the 3D glasses from the 3D glasses.

If it is determined that the attribute information of the 3D glasses has been modified when playing the 3D image, the communicator may receive the attribute information of the 3D glasses from the 3D glasses.

According to another aspect of another exemplary embodiment, there is provided a method for adjusting an image quality of a 3D image of a 3D display apparatus which is connected to 3D glasses and an external player to display the 3D image. The method may include: acquiring attribute information of the 3D glasses; transmitting the attribute information of the 3D glasses to the external player; receiving the 3D image of which image quality has been adjusted according to the attribute information of the 3D glasses; and displaying the 3D image of which image quality has been adjusted.

The attribute information of the 3D glasses may be transmitted using one of a high definition multimedia interface display data channel (HDMI DDC) communication, a HDMI consumer electronics control (CEC) communication, and an Ethernet communication.

If the HDMI DDC communication is used, the attribute information of the 3D glasses may be stored in extended display identification data (EDID) information and then transmitted.

According to another aspect of another exemplary embodiment, there is provided a 3D display apparatus which is connected to 3D glasses and an external player to display a 3D image. The 3D display apparatus may include: a display unit which displays the 3D image; a first communicator which communicates with the 3D glasses; a second communicator which communicates with the external player; and a controller which transmits the attribute information of the 3D glasses, which is acquired from the first communicator, to the external player and receives the 3D image of which image quality has been adjusted according to the attribute information of the 3D glasses, from the external player to display the 3D image of which image quality has been adjusted.

The second communicator may communicate with the external player using one of a HDMI DDC communication, a HDMI CEC communication, and an Ethernet communication.

If the HDMI DDC communicator is used, the second communicator may store and transmit the attribute information of the 3D glasses in EDID information.

According to another aspect of another exemplary embodiment, there is provided 3D glasses which are connected to a 3D display apparatus to view a 3D image. The 3D glasses may include: a 3D glasses communicator which communicates with the 3D display apparatus; a storage unit which stores attribute information of the 3D glasses; and a controller which transmits the attribute information of the 3D glasses to the 3D display apparatus.

The attribute information of the 3D glasses may include at least one of transmissivity of light which passes through the 3D glasses, a contrast change rate of an image which passes through the 3D glasses, a color hue change rate of the image, a clarity change rate of the image, information on a type of the 3D glasses, and information on a manufacturing company of the 3D glasses.

If it is determined that a viewer has worn the 3D glasses, the controller may transmit the attribute information of the 3D glasses to the 3D display apparatus.

If it is determined that the attribute information of the 3D glasses has been modified when playing the 3D image, the controller may transmit the attribute information of the 3D glasses to the 3D display apparatus.

According to another aspect of another exemplary embodiment, there is provided a system for providing a 3D image. The system may include: 3D glasses which store attribute information of the 3D glasses and transmit the attribute information of the 3D glasses to the 3D display apparatus; and a 3D display apparatus which receives the attribute information of the 3D glasses to automatically adjust an image quality of the 3D image according to the attribute information of the 3D glasses.

Additional aspects and advantages of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since that would obscure the exemplary embodiments with unnecessary detail.

Figure 1:
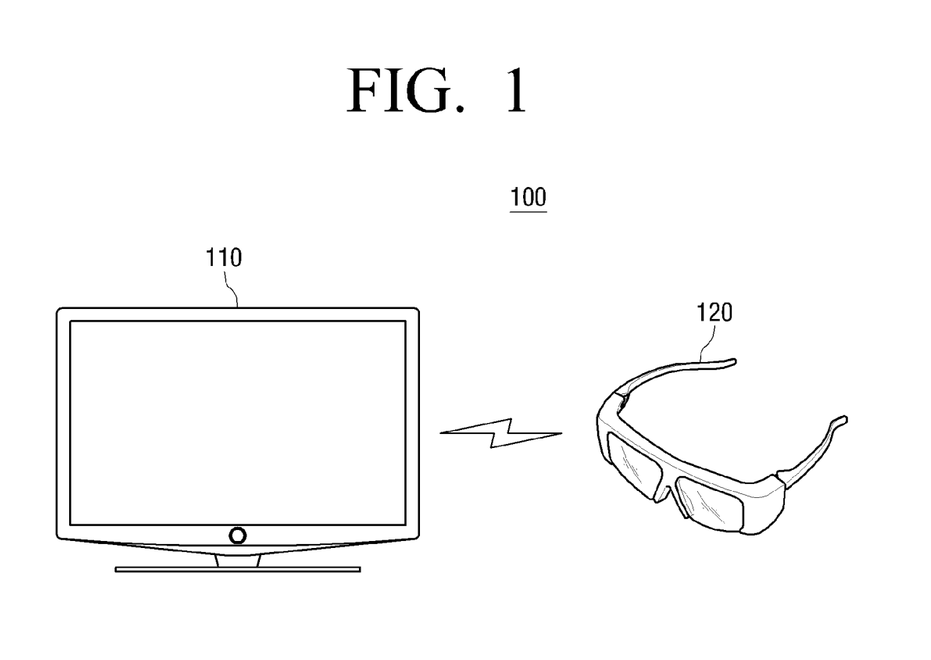
FIG. 1 is a view illustrating a system for providing a 3-dimensional (3D) image according to an exemplary embodiment.

FIG. 1 is a view illustrating a system 100 for providing a 3-dimensional (3D) image according to an exemplary embodiment. Referring to FIG. 3, the system 100 includes a 3D television (TV) 110 which displays a 3D image on a screen and 3D glasses 120 through which the 3D image is viewed.

The 3D TV 110 is a kind of display apparatus, receives a 3D image from a photographing apparatus, such as a camera or the like, or a 3D image which is captured by the camera, edited and/or processed in a broadcasting station, and transmitted from the broadcasting station, and processes the received 3D image, and displays the processed 3D image on the screen. In particular, the 3D TV 110 processes left and right eye images, time-divides the left and right eye images, and alternately displays the left and right eye images, with reference to a format of the 3D image.

The 3D TV 110 also generates a sync signal, which synchronizes with timings of the time-division and display of the left and right eye images, and transmits the sync signal to the 3D glasses 120. Here, the sync signal is generated by periodically generating a plurality of pulses in each vertical sync signal Vsync of the 3D TV 110.

The 3D TV 110 acquires attribute information of the 3D glasses 120 from an external device. Here, the attribute information of the 3D glasses 120 includes at least one of transmissivity of light which passes through the 3D glasses 120, a contrast change rate of an image which passes through the 3D glasses 120, a color hue change rate of the image, a clarity change rate of the image, information on a type of the 3D glasses 120, and information on a manufacturing company of the 3D glasses 120. The 3D TV 110 automatically adjusts an image quality of the 3D image and outputs the 3D image according to the acquired attribute information.

Figure 2:
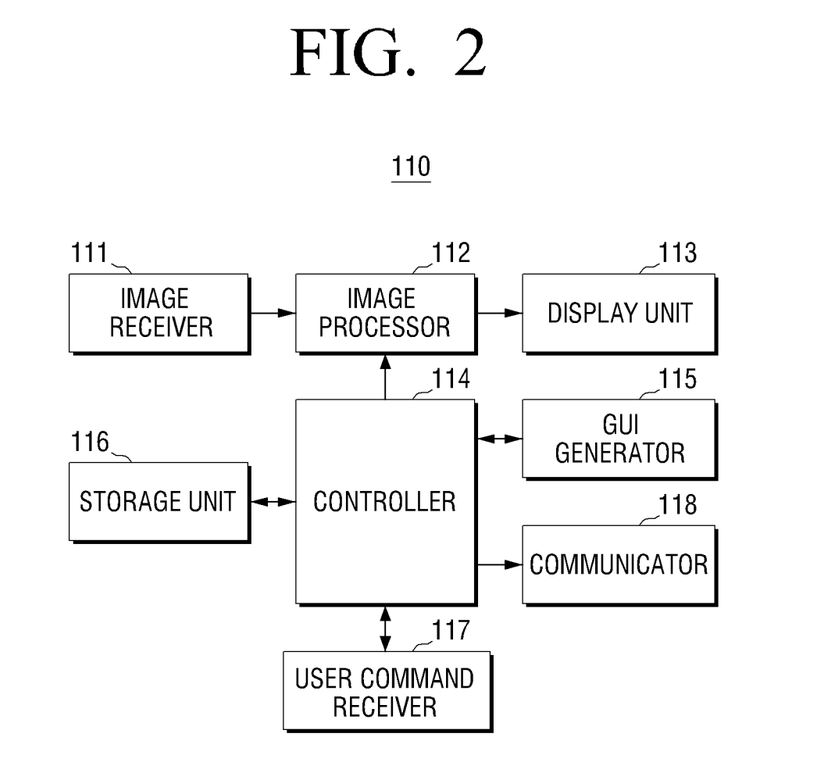
FIG. 2 is a block diagram illustrating a 3D television (TV) according to an exemplary embodiment.

A structure of the 3D TV 110 will now be described in more detail with reference to FIG. 2. FIG. 2 is a block diagram illustrating the 3D TV 110 according to an exemplary embodiment.

Referring to FIG. 2, the 3D TV 110 includes an image receiver 111, an image processor 112, a display unit 113, a controller 114, a graphical user interface (GUI) generator 115, a storage unit 116, a user command receiver 117, and a communicator 118.

The image receiver 111 receives a broadcast from a broadcasting station or a satellite by wire or wireless and demodulates the broadcast. The image receiver 111 is connected to an external player, such as a digital video disc (DVD) player or the like, to receive a 3D image from the external player. The external player may be connected to the image receiver 111 by wireless or may be connected to the image receiver 111 by wire or wireless through an interface such as a super video (S-Video), a component, a composite, a D-subminiature (D-Sub), a digital visual interface (DVI), a high definition multimedia interface (HDMI), or the like.

Here, the 3D image received by the image receiver 111 may have various types of formats. In particular, the 3D image may have one of formats which comply with a general frame sequence method, a top-bottom method, a side-by-side method, a horizontal interleaving method, a vertical interleaving method, and a checkerboard method.

The image receiver 111 transmits the received 3D image to the image processor 112.

The image processor 112 performs signal processing jobs, such as video decoding, format analyzing, video scaling, etc., and a GUI adding process with respect to the 3D image. In particular, the image processor 112 generates left and right eye images corresponding to a size (e.g., 1920*1080) of a screen using the format of the 3D image input into the image receiver 111. The image processor 112 adds a GUI, which is received from the GUI generator 115 that will be described later, to the left or right eye image or both of the left and right images.

The image processor 112 processes the 3D image to adjust the image quality of the 3D image according to the attribute information of the 3D glasses 120 received from the external device, under control of the controller 114. The method for adjusting the image quality of the 3D image will be described in more detail later.

The image processor 112 time-divides the left and right eye images and alternately transmits the left and right eye images to the display unit 113. In other words, the image processor 112 transmits the left and right eye images to the display unit 113 in a time order of "a left eye image L1, a right eye image R1, a left eye image L2, a right eye image R2, . . . ."

The display unit 113 alternately outputs and provides the left and right eye images output from the image processor 112 to a viewer.

The GUI generator 115 generates the GUI which is to be displayed on a display. The GUI generated by the GUI generator 115 is transmitted to the image processor 112 to be added to the left or right eye image or both of the left and right eye images which is to be displayed on the display.

In particular, if the image quality of the 3D image is automatically adjusted according to the attribute information of the 3D glasses 120, the GUI generator 115 generates a GUI of an On-Screen-Display (OSD) format including information indicating that the image quality of the 3D image has been adjusted.

The storage unit 116 is a storage medium which stores various types of programs, etc. necessary for operating the 3D TV 110 and may be realized as a memory, a hard disk drive (HDD), or the like.

The user command receiver 117 receives a user command from an input unit, such as a remote controller or the like, and transmits the user command to the controller 114.

The communicator 118 generates the sync signal which synchronizes with the alternately output left and right eye images and transmits the sync signal to the 3D glasses 120. This is to alternately open and/or close the 3D glasses 120 in order to display the left eye image on the display unit 113 for a left eye open time of the 3D glasses 120 and the right eye image on the display unit 113 for a right eye open time of the 3D glasses 120, through synchronization between the 3D TV 110 and the 3D glasses 120.

The communicator 118 receives a signal including the attribute information of the 3D glasses 120 from the external device, in particular, from the 3D glasses 120. Here, the signal including the attribute information of the 3D glasses 120 may be received through a radio frequency (RF) communication or a wireless or wire communication such as an infrared communication or the like.

The attribute information of the 3D glasses 120 includes at least one of the transmissivity of the light which passes through the 3D glasses 120, the contrast change rate of the image which passes through the 3D glasses 120, the color hue change rate of the image, the clarity change rate of the image, the information on the type of the 3D glasses 120, and the information on the manufacturing company of the 3D glasses 120. The 3D TV 110 automatically adjusts the image quality of the 3D image and outputs the 3D image according to the acquired attribute information.

If it is determined that the viewer has worn the 3D glasses 120, the communicator 118 receives the attribute information of the 3D glasses 120 from the 3D glasses 120. Here, the determination that the viewer has worn the 3D glasses 120 may be performed through a signal that the 3D glasses 120 transmit to the 3D TV 110 when the 3D glasses 120 senses that the viewer has worn the 3D glasses 120, through a sensor (not shown).

If it is determined that the attribute information of the 3D glasses 120 has been modified when playing the 3D image, the communicator 180 receives the attribute information of the 3D glasses 120 from the 3D glasses 120. For example, if a shutter speed of the 3D glasses 120 is adjusted to modify transmissivity of light passing through the 3D glasses 120, the communicator 118 receives new attribute information of the 3D glasses 120 from the 3D glasses 120.

The controller 114 controls an overall operation of the 3D TV 110 according to the user command received from the user command receiver 117.

In particular, the controller 114 controls the image receiver 111 and the image processor 112 to receive the 3D image, divide the 3D image into the left and right eye images, and scale or interpolate the left and right eye images to sizes appropriate to display the left and right eye images on one screen. The controller 114 controls the GUI generator 115 to generate the GUI corresponding to the user command received from the user command receiver 117. The controller 114 controls the communicator 118 to generate and transmit the sync signal which synchronizes with output timings of the left and right eyes.

The controller 114 controls the image processor 112 to automatically adjust the image quality of the 3D image according to the attribute information of the 3D glasses 120 received from the communicator 118. As described above, the attribute information of the 3D glasses 120 includes at least one of the transmissivity of the light which passes through the 3D glasses 120, the contrast change rate of the image which passes through the 3D glasses 120, the color hue change rate of the image, the clarity change rate of the image, the information on the type of the 3D glasses 120, and the information on the manufacturing company of the 3D glasses 120.

For example, if information on the transmissivity of the light which passes through the 3D glasses 120 is received, the controller 114 adjusts brightness of the 3D image to be higher according to the information on the transmissivity of the light. A method for adjusting the image quality of the 3D image according to the transmissivity of the light which passes through the 3D glasses 120, through the controller 114 will now be described in more detail with reference to FIGS. 3A and 3B.

Figure 3A:
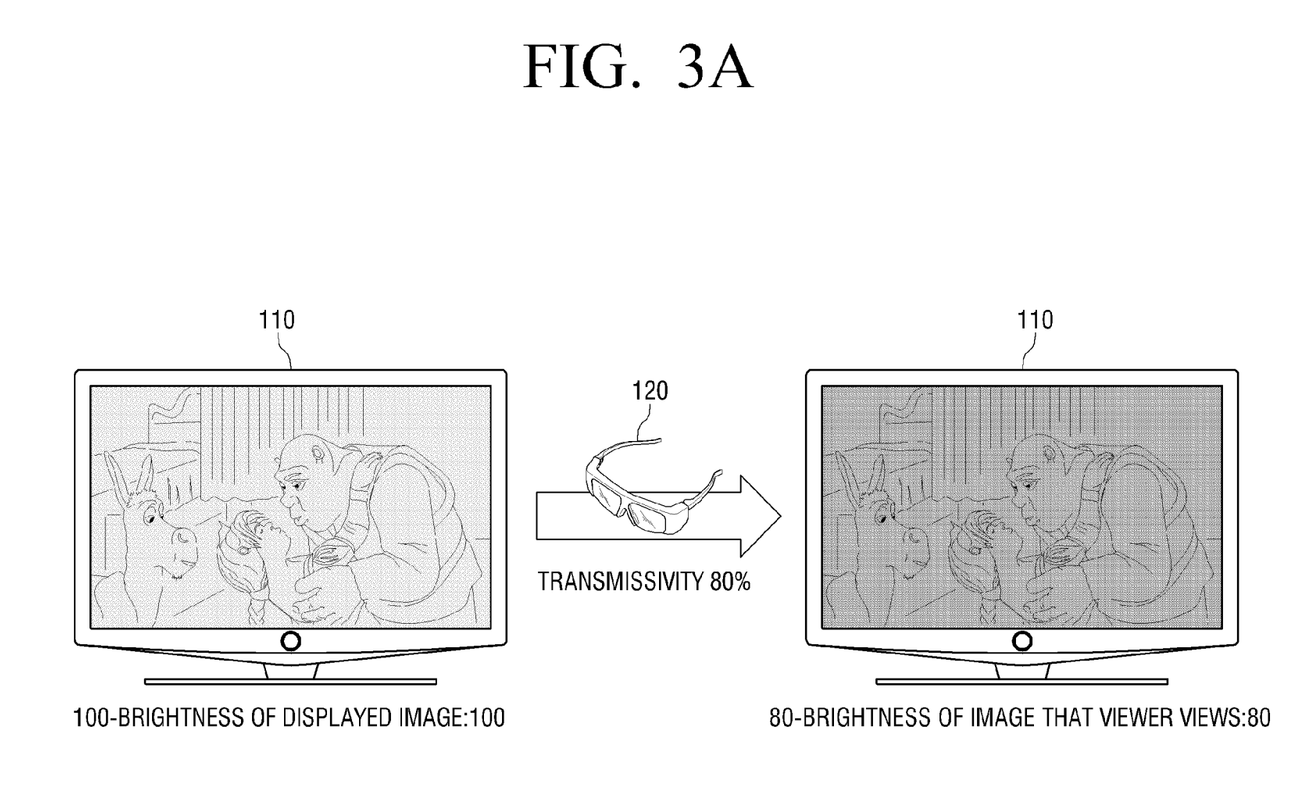
FIGS. 3A and 3B are views illustrating a method for adjusting an image quality of a 3D image using information on transmissivity of light which passes through 3D glasses, according to exemplary embodiments.

FIG. 3A is a view illustrating brightness of a 3D image that a viewer views if an image quality of the 3D image is not adjusted, according to an exemplary embodiment. As shown in FIG. 3A, if the 3D image is output from the 3D TV 110 and then passes through the 3D glasses 120, the brightness of the 3D image is seen darkly by eyes of the viewer. For example, if transmissivity of light passing through the 3D glasses 120 is 80%, and the brightness of the 3D image output from the 3D TV 110 is 100, the brightness of the 3D image that the viewer views through the 3D glasses 120 is 80. Therefore, the viewer views a 3D image darker than the 3D image output from the 3D TV 110.

In order to solve this problem, the controller 114 controls the image processor 112 to adjust the image quality of the 3D image using the information on the transmissivity of the light passing through the 3D glasses 120, wherein the information is acquired from the 3D glasses 120 through the communicator 118.

Figure 3B:
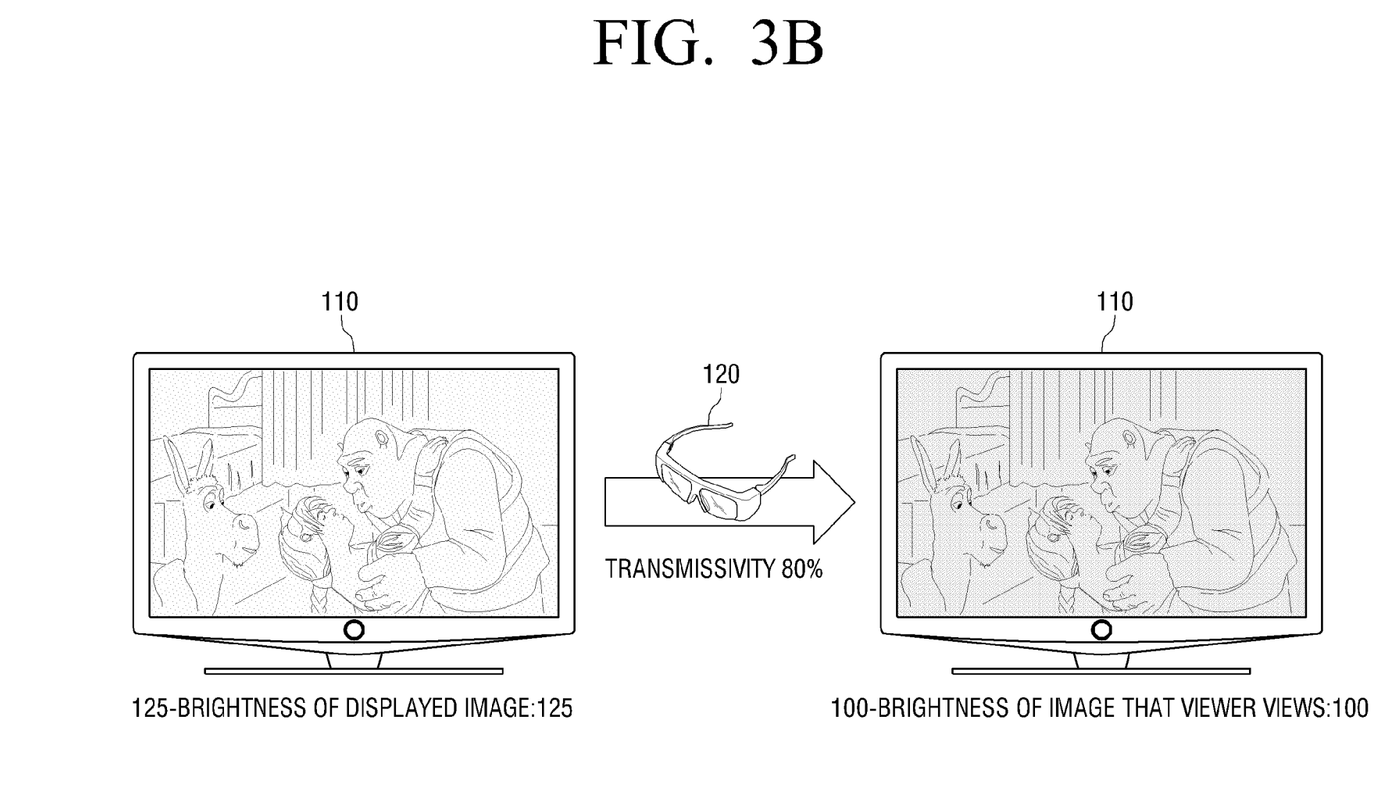

FIG. 3B is a view illustrating the brightness of the 3D image that the viewer views if the image quality of the 3D image is adjusted, according to an exemplary embodiment. In more detail, the controller 114 controls the image processor 112 to enhance the brightness of the displayed 3D image using the information on the transmissivity of the light passing through the 3D glasses 120. For example, if information on transmissivity of light passing through first 3D glasses includes information indicating that the transmissivity of the light passing through the first 3D glasses is 80%, wherein the information on the transmissivity is received from the first 3D glasses, the controller 114 controls the image processor 112 to process brightness of a 3D image to be 125 so that brightness of an image that the viewer wants to view is 100.

If information on transmissivity of light passing through second 3D glasses includes information indicating that the transmissivity of the light passing through the second 3D glasses is 66.6%, wherein the information on the transmissivity is received from the second 3D glasses, the controller 114 controls the image processor 112 to process the brightness of the 3D image to be 150 so that brightness of an image that the viewer wants to view is 100.

Therefore, although the viewer views a 3D image using other 3D glasses, the viewer views the 3D image having normal brightness using the information on the transmissivity of the light included in the 3D glasses 120. However, the numerical values mentioned to describe the above exemplary embodiments are only an exemplary embodiment, but the present inventive concept is not limited thereto.

The description will return to FIG. 2. If the information on the contrast change rate of the image passing through the 3D glasses 120 is received, the controller 114 enhances a contrast ratio of the 3D image according to the information on the contrast change rate.

For example, if a contrast ratio of an image that the viewer views without using 3D glasses is 500:1, and a contrast change rate of an image passing through first 3D glasses is −20%, the controller 114 controls the image processor 112 so that a contrast ratio of a 3D image is 625:1, and thus a contrast ratio of an image that the viewer wants to view is 500:1.

If the information on the color hue change rate of the image passing through the 3D glasses 120 is received, the controller 114 adjusts a color hue of the 3D image according to the information on the color hue change rate. For example, if the information on the color hue change rate includes information indicating that a color of the 3D image is wholly changed to a red color hue when the 3D image passes through the 3D glasses 120, the controller 114 controls the image processor 112 to process the 3D image as a blue color hue that is a complementary color of the red color hue. Therefore, since the controller 114 outputs the image passing through the 3D glasses 120 in a complementary color of a color hue that is changed, the 3D TV 110 prevents a color hue change.

If the information on the clarity change rate of the image passing through the 3D glasses 120 is received, the controller 114 adjusts the color hue of the 3D image according to the information on the clarity change rate of the image. For example, if the information on the clarity change rate of the image includes information indicating that the clarity change rate of the image passing through the 3D glasses 120 decreases by 20%, the controller 114 controls the image processor 112 so that a clarity of the 3D image is 125, and thus a clarity of the image that the viewer wants to view is 100.

If the information on the type of the 3D glasses 120 is received, the controller 114 adjusts the image quality of the 3D image according to the information on the type of the 3D glasses 120. For example, if information indicating that the 3D glasses 120 are shutter type 3D glasses is received, the controller 114 adjusts the image quality of the 3D image in consideration of the shutter speed of the 3D glasses 120. If information indicating that the 3D glasses 120 are polarization type 3D glasses is received, the controller 114 adjusts the image quality of the 3D image in consideration of an amount of light which is polarized through the 3D glasses 120 and then incident onto the 3D glasses 120.

If the information on the manufacturing company of the 3D glasses 120 is received, the controller 114 adjusts the image quality of the 3D image according to the information on the manufacturing company of the 3D glasses 120. Here, optical information depending on the manufacturing company of the 3D glasses 120 is stored in the storage unit 116 of the 3D TV 110.

TABLE 1

|  | Transmissivity of Light | Contrast Change Rate | Color Hue Change Rate | Clarity Change Rate | Glasses Type |
|---|---|---|---|---|---|
| Company A | 80% | 20% Decrease | Red Color | 20% Decrease | Shutter |
| Company B | 66.6% | 10% Decrease | Blue Color | 15% Decrease | Polarization |
| Company C | 100% | 5% Decrease | n/a | 10% Decrease | Shutter |

For example, when the optical information depending on the manufacturing company is as shown in Table 1, if information indicating that the manufacturing company of the 3D glasses 120 is company A is received from the communicator 118, the controller 114 processes the brightness of the output 3D image to be 125 so that brightness of the light passing through the 3D glasses 120 is 100. The controller 114 processes the contrast ratio of the output 3D image to be 625:1 so that the contrast ratio of the 3D image that the viewer views is 500:1. The controller 114 processes the color hue of the output 3D image in a blue color that is a complementary color of a red color so that the color hue of the 3D image that the viewer views is not changed. The controller 114 processes the clarity of the output 3D image to be 125 so that the clarity of the 3D image that the viewer views is 100. The controller 114 calculates the shutter speed, etc. to process the image quality of the 3D image by considering that the type of the 3D glasses 120 of the company A is a shutter type.

If information indicating that the manufacturing company of the 3D glasses 120 is company B is received from the communicator 118, the controller 114 processes the brightness of the output 3D image to be 150 so that the brightness of the light passing through the 3D glasses 120 is 100. The controller 114 processes the contrast ratio of the output 3D image to be 556:1 so that the contrast ratio of the 3D image that the viewer views is 500:1. The controller 114 processes the color hue of the output 3D image to be a red color that is a complementary color of a blue color so that the color hue of the 3D image that the viewer views is not changed. The controller 114 processes the clarity of the output 3D image to be 118 so that the clarity of the 3D image that the viewer views is 100. The controller 114 calculates an amount of polarized and incident light, etc. to process the image quality of the output 3D image by considering that the type of the 3D glasses 120 of the company A is a polarization type.

If information indicating that the manufacturing company of the 3D glasses 120 is company C is received from the communicator 118, the 3D glasses 120 of the company C transmit 100% of light. Therefore, the controller 114 controls the 3D image to be output with its original brightness. The controller 114 processes the contrast ratio of the output 3D image to be 526:1 so that the contrast ratio of the 3D image that the viewer views is 500:1. Since the 3D glasses 120 of the company C do not change the color hue of the 3D image, the controller 114 controls the 3D image to be output in its original color hue. The controller 114 processes the clarity of the output 3D image to be 111 so that the clarity of the 3D image that the viewer views is 100. The controller 114 calculates the shutter speed, etc. to process the image quality of the output 3D image by considering that the type of the 3D glasses 120 of the company C is the shutter type.

Therefore, the 3D TV 110 provides a 3D image having a further optimal image quality to the viewer according to the information on the manufacturing company.

Referring to FIG. 1 again, the 3D glasses 120 alternately open and/or close left and right eye glasses according to the sync signal received from the 3D TV 110 so that the viewer respectively views the left and right eye images through left and right eyes of the viewer.

The 3D glasses 120 transmit the attribute information of the 3D glasses 120 to the 3D TV 110 so that the 3D TV 110 adjusts the image quality of the 3D image. A structure of the 3D glasses 120 will now be described in more detail with reference to FIG. 4.

Figure 4:
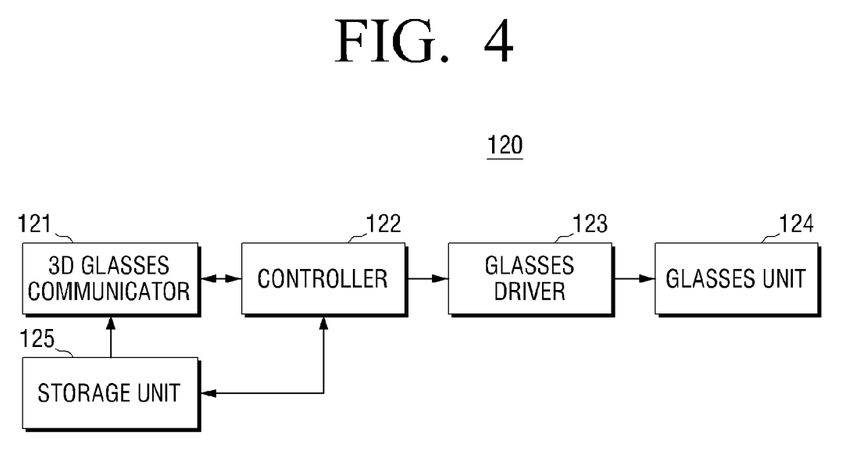
FIG. 4 is a block diagram illustrating 3D glasses according to an exemplary embodiment.

FIG. 4 is a block diagram illustrating the 3D glasses 120 according to an exemplary embodiment. Referring to FIG. 4, the 3D glasses 120 include a 3D glasses communicator 121, a controller 122, a glasses driver 123, a glasses unit 124, and a storage unit 125.

The 3D glasses communicator 121 receives the sync signal of the 3D image from the communicator 118 of the 3D TV 110 which is connected to the 3D glasses 120 by wire or wireless.

The 3D glasses communicator 121 transmits the signal including the attribute information of the 3D glasses 120 to the communicator 118 of the 3D TV 110. Here, the signal including the attribute information of the 3D glasses 120 may be transmitted to the communicator 118 of the 3D TV 110 through an RF communication, an infrared communication, or a wire communication.

The attribute information of the 3D glasses 120 includes at least one of the transmissivity of the light which passes through the 3D glasses 120, the contrast change rate of the image which passes through the 3D glasses 120, the color hue change rate of the image, the clarity change rate of the image, the information on the type of the 3D glasses 120, and the information on the manufacturing company of the 3D glasses 120.

If it is determined that the viewer has worn the 3D glasses 120, through the sensor (not shown), the 3D glasses communicator 121 transmits information indicating that the viewer has worn the 3D glasses 120 and the attribute information of the 3D glasses 120. Here, the information indicating that the viewer has worn the 3D glasses 120 and the attribute information of the 3D glasses 120 may be transmitted as one signal or separate signals.

If the attribute information of the 3D glasses 120 is modified when playing the 3D image, e.g., the shutter speed of the 3D glasses 120 is adjusted, the 3D glasses communicator 118 transmits information indicating that the attribute information of the 3D glasses 120 has been modified and new attribute information of the 3D glasses 120 together. Here, the information indicating that the attribute information of the 3D glasses 120 has been modified and the new attribute information of the 3D glasses 120 may be transmitted as one signal or separate signals.

The controller 122 controls an overall operation of the 3D glasses 120. In particular, the controller 122 generates a control signal based on an output signal received from the 3D glasses communicator 121 and transmits the control signal to the glasses driver 123 to control the glasses driver 123. In particular, the controller 122 controls the glasses driver 123 to generate a driving signal for driving the glasses driver 124, based on the output signal.

If it is determined that the viewer has worn the 3D glasses 120, the controller 122 controls the 3D glasses communicator 121 to transmit the information indicating that the viewer has worn the 3D glasses 120 and the attribute information of the 3D glasses 120 together.

If the attribute information of the 3D glasses 120 is modified when playing the 3D image, e.g., the shutter speed of the 3D glasses 120 is adjusted, the controller 122 controls the 3D glasses communicator 121 to transmit the information indicating that the attribute information of the 3D glasses 120 has been modified and the new attribute information of the 3D glasses 120 together.

The glasses driver 123 generates the driving signal based on the control signal received from the controller 122.

The glasses unit 124 includes left and right eye glasses and opens and/or closes the left and right eye glasses according to the driving signal received from the glasses driver 123.

The storage unit 125 stores the attribute information of the 3D glasses 120. Here, the attribute information of the 3D glasses 120 includes at least one of the transmissivity of the light which passes through the 3D glasses 120, the contrast change rate of the image which passes through the 3D glasses 120, the color hue change rate of the image, the clarity change rate of the image, the information on the type of the 3D glasses 120, and the information on the manufacturing company of the 3D glasses 120. In particular, the storage unit 125 may be realized as a memory, a HDD, or the like.

Figure 5:
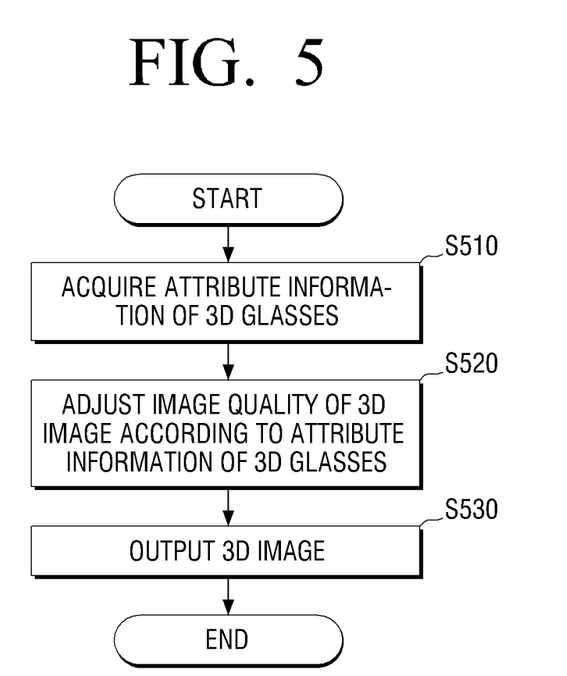
FIG. 5 is a flowchart illustrating a method for adjusting an image quality of a 3D image according to an exemplary embodiment.

FIG. 5 is a flowchart illustrating a method for adjusting an image quality of a 3D image according to an exemplary embodiment.

The 3D TV 110 acquires the attribute information of the 3D glasses 120 from the 3D glasses 120 (S510). Here, the attribute information of the 3D glasses 120 includes at least one of the transmissivity of the light which passes through the 3D glasses 120, the contrast change rate of the image which passes through the 3D glasses 120, the color change rate of the image, the clarity change rate of the image, the information on the type of the 3D glasses 120, and the information on the manufacturing company of the 3D glasses 120. The 3D TV 110 acquires the attribute information of the 3D glasses 120 from the 3D glasses 120 using one of RF communication, infrared communication, and wire communication. If the 3D TV 110 acquires the information indicating that the viewer has worn the 3D glasses 120 or the information indicating that the attribute information of the 3D glasses 120 has been modified, the 3D TV 110 acquires the attribute information of the 3D glasses 120 from the 3D glasses 120.

The 3D TV 110 adjusts the image quality of the 3D image according to the attribute information of the 3D glasses 120 (S520). In more detail, if the 3D TV 120 acquires the information on the transmissivity of the light passing through the 3D glasses 120, the 3D TV 110 adjusts the image quality of the 3D image to enhance the brightness of the 3D image according to the information on the transmissivity of the light. If the 3D TV 110 acquires the information on the contrast change rate of the image passing through the 3D glasses 120, the 3D TV 110 adjusts the image quality of the 3D image to enhance the contrast ratio of the 3D image according to the information on the contrast change rate of the image. If the 3D TV 110 acquires the information on the color hue change rate of the image passing through the 3D glasses 120, the 3D TV 110 adjusts the color hue of the 3D image according to the information on the color hue change rate of the image. As described with reference to FIG. 2, the 3D TV 110 adjusts the image quality of the 3D image using the information on the clarity change rate of the image passing through the 3D glasses 120, the information on the type of the 3D glasses 120, and the information on the manufacturing company of the 3D glasses 120.

After the image quality of the 3D image is adjusted according to the attribute information of the 3D glasses 120, the 3D TV 110 outputs the 3D image of which image quality has been adjusted (S530). Here, the output 3D image may be alternately displayed as left and right eye images so that the viewer feels a 3D effect.

As described above, if the image quality of the 3D image is adjusted using the attribute information of the 3D glasses 120, the brightness of the 3D image is prevented from being made darker by the 3D glasses 120 or the color hue of the 3D image is prevented from being degraded by the 3D glasses 120 when the viewer views the 3D image through a glasses type 3D display apparatus. Therefore, the viewer views the 3D image with an optimal image quality.

A method for adjusting an image quality of a 3D image using the attribute information of the 3D glasses 120 according to another exemplary embodiment will now be described with reference to FIGS. 6 and 7.

Figure 6:
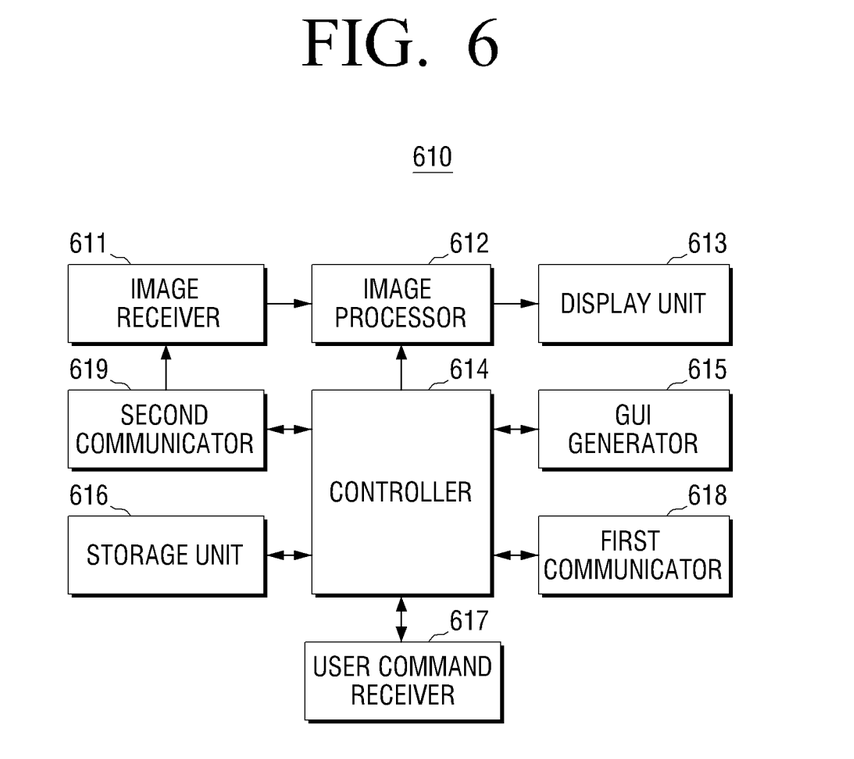
FIG. 6 is a block diagram illustrating a 3D TV for adjusting an image quality of a 3D image using an external player, according to an exemplary embodiment.

FIG. 6 is a block diagram illustrating a 3D TV 610 according to another exemplary embodiment.

Referring to FIG. 6, the 3D TV 610 includes an image receiver 611, an image processor 612, a display unit 613, a controller 614, a GUI generator 615, a storage unit 616, a user command receiver 617, a first communicator 618, and a second communicator 169.

The image receiver 611 receives an image through the second communicator 619 and demodulates the image. In particular, the image receiver 611 is connected to an external player, such as a DVD player or the like, through the second communicator 619 to receive a 3D image from the external player.

The image receiver 611 receives the 3D image of which image quality has been adjusted according to the attribute information of the 3D glasses 120, from the external player through the second communicator 619.

The image receiver 611 transmits the 3D image to the image processor 612.

The image processor 612 performs signal processing jobs, such as video decoding, format analyzing, video scaling, etc., and a GUI adding process with respect to the 3D image. Here, the 3D image received from the image receiver 611 is an image of which image quality has been adjusted by the external player according to the attribute information of the 3D glasses 120.

The image processor 612 generates left and right eye images corresponding to a size (e.g., 1920*1080) of one screen using a format of the 3D image input into the image receiver 611. The image processor 612 adds a GUI, which is received from the GUI generator 615 that will be described later, to the left or right eye image or both of the left and right eye images.

The image processor 612 time-divides the left and right eye images and alternately transmits the time-divided left and right eye images to the display unit 613. In other words, the image processor 612 transmits the left and right eye images to the display unit 613 in a time order of "a left eye image L1, a right eye image R1, a left eye image L2, a right eye image R2 . . . ."

The display unit 613 alternately outputs and provides the left and right eye images output from the image processor 612 to a viewer.

The GUI generator 615 generates the GUI which is to be displayed on a display. The GUI generated by the GUI generator 615 is transmitted to the image processor 612 to be added to the left or right eye image or both of the left and right eye images which is to be displayed on the display.

The storage unit 616 is a storage medium which stores various types of programs necessary for operating the 3D TV 610 and may be realized as a memory, a HDD, or the like.

The user command receiver 617 receives a user command from an input unit, such as a remote controller or the like, and transmits the user command to the controller 614.

The first communicator 618 generates a sync signal which synchronizes with the alternately output left and right eye images and transmits the sync signal to the 3D glasses 120. This is to alternately open and/or close the 3D glasses 120 in order to display the left eye image on the display unit 613 for a left eye open time of the 3D glasses 120 and the right eye image on the display unit 613 for a right eye open time of the 3D glasses 120, through synchronization between the 3D TV 610 and the 3D glasses 120.

The first communicator 618 receives a signal including the attribute information of the 3D glasses 120 from an external device, in particular, from the 3D glasses 120. Here, the signal including the attribute information of the 3D glasses 120 may be received through an RF communication, an infrared communication, or a wire communication. Here, the attribute information of the 3D glasses 120 includes at least one of transmissivity of light which passes through the 3D glasses 120, a contrast change rate of an image which passes through the 3D glasses 120, a color hue change rate of the image, a clarity change rate of the image, information on a type of the 3D glasses 120, and information on a manufacturing company of the 3D glasses 120.

If it is determined that the viewer has worn the 3D glasses 120, the first communicator 618 receives the attribute information of the 3D glasses 120 from the 3D glasses 120. The determination that the viewer has worn the 3D glasses 120 may be performed through a signal transmitted to the 3D TV 610 when the 3D glasses 120 sense that the viewer has worn the 3D glasses, through a sensor (not shown).

If it is determined that the attribute information of the 3D glasses 120 has been modified when playing the 3D image, the first communicator 618 receives the attribute information of the 3D glasses 120 from the 3D glasses 120. For example, if a shutter speed of the 3D glasses 120 is adjusted, and thus an amount of light passing through the 3D glasses 120 is modified, the first communicator 618 receives the attribute information of the 3D glasses 120 from the 3D glasses 120.

The second communicator 619 is connected to the external player to transmit and/or receive a signal to and/or from the external player. In particular, the second communicator 619 transmits the attribute information of the 3D glasses 120 received from the 3D glasses 120 to the external player.

The second communicator 619 receives the 3D image of which image quality has been adjusted according to the attribute information of the 3D glasses 120, from the external player.

Here, the second communicator 619 communicates with the external player using one of a HDMI display data channel (DDC) communication, a HDMI consumer electronics control (CEC) communication, and an Ethernet communication. In particular, if the second communicator 619 uses the HDMI DDC communication, the attribute information of the 3D glasses 120 may be stored in extended display identification data (EDID) information and then transmitted.

The controller 614 controls an overall operation of the 3D TV 610 according to the user command received from the user command receiver 617.

In particular, the controller 614 controls the first communicator 618 to acquire the attribute information of the 3D glasses 120 from the 3D glasses 120. The controller 614 controls the second communicator 619 to transmit the attribute information of the 3D glasses 120 to the external player.

The controller 614 is connected to the external player through the second communicator 619 to receive the 3D image of which image quality has been adjusted by the external player according to the attribute information of the 3D glasses 120. Here, a method of adjusting the image quality through the external player is the same as that described with reference to FIGS. 2 and 3.

The controller 614 controls the image receiver 611 and the image processor 612 to divide the 3D image into the left and right eye images and scale or interpolate the left and right eye images to sizes appropriate to be displayed on one screen.

Figure 7:
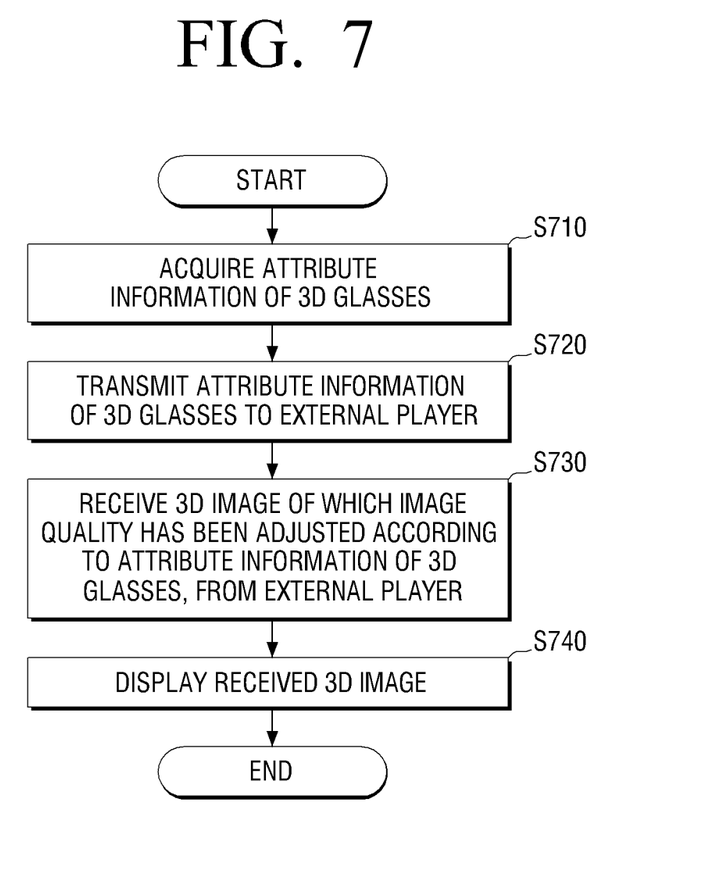
FIG. 7 is a flowchart illustrating a method for adjusting an image quality of a 3D image using an external player, according to an exemplary embodiment.

FIG. 7 is a flowchart illustrating a method for adjusting an image quality of a 3D image using an external player according to an exemplary embodiment.

The 3D TV 610 acquires the attribute information of the 3D glasses 120 from the 3D glasses 120 (S710). Here, the attribute information of the 3D glasses 120 includes at least one of the transmissivity of the light which passes through the 3D glasses 120, the contrast change rate of the image which passes through the 3D glasses 120, the color hue change rate of the image, the clarity change rate of the image, the information on the type of 3D glasses 120, and the information on the manufacturing company of the 3D glasses 120.

The 3D TV 610 transmits the attribute information of the 3D glasses 120 acquired from the 3D glasses 120 to the external player (S720). Here, the 3D TV 610 transmits the attribute information of the 3D glasses 120 to the external player using one of HDMI DDC communication, HDMI CEC communication, and Ethernet communication. In particular, if the 3D TV 610 uses the HDMI DDC communication, the attribute information of the 3D glasses 120 may be stored in EDID information and then transmitted.

The 3D TV 610 receives the 3D image of which image quality has been adjusted according to the attribute information of the 3D glasses 120, from the external player (S730). Here, the method of adjusting the image quality of the 3D image according to the attribute information of the 3D glasses 120 is the same as that described with reference to FIGS. 2 and 3.

The 3D TV 610 performs signal processing with respect to the 3D image and displays the 3D image (S740). Here, the output 3D image is alternately displayed as the left and right eye images so that the viewer feels the 3D effect.

As described above, if the 3D image of which image quality has been adjusted according to the attribute information of the 3D glasses 120 is received from the external player, the brightness of the 3D image is prevented from being made darker by the 3D glasses 120 or a color hue of the 3D image is prevented from being degraded by the 3D glasses 120 when the viewer views the 3D image through a glasses type 3D display apparatus. Therefore, the viewer views the 3D image with an optimal image quality.

According to the exemplary embodiments described above, a 3D display apparatus is the 3D TV 110, but this is only an exemplary embodiment. The present inventive concept may be applied to any 3D display apparatus which can display a shutter glass type 3D image. For example, the 3D display apparatus may be realized as a 3D projection, a 3D monitor, or the like.

Also, attribute information of 3D glasses includes at least one of transmissivity of light which passes through the 3D glasses, a contrast change rate of an image which passes through the 3D glasses, a color hue change rate of the image, a clarity change rate of the image, information on a type of the 3D glasses, and information on a manufacturing company of the 3D glasses. However, this is only an exemplary embodiment, and the attribute information may include information such as information on optical characteristics of the 3D glasses and information on characteristics affecting an image quality, in addition to, or instead of, the above mentioned information.

As described above, according to various exemplary embodiments, brightness of a 3D image is prevented from being made darker by 3D glasses or a color hue of the 3D image is prevented from being degraded by the 3D glasses when a viewer views the 3D image through a glasses type 3D display apparatus. Accordingly, the viewer views the 3D image with an optimal image quality.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for adjusting an image quality of a 3-dimension (3D) image of a 3D display apparatus which is connected to 3D glasses to display the 3D image, the method comprising:

acquiring attribute information of the 3D glasses; and
adjusting the image quality of the 3D image to be displayed according to the attribute information of the 3D glasses,
wherein the attribute information includes information on optical characteristics of the 3D glasses.

2. The method as claimed in claim 1, wherein the attribute information of the 3D glasses comprises at least one of transmissivity of light which passes through the 3D glasses, a contrast change rate of an image which passes through the 3D glasses, a color hue change rate of the image, a clarity change rate of the image, information on a type of the 3D glasses, and information on a manufacturing company of the 3D glasses.

3. The method as claimed in claim 2, wherein the adjusting comprises adjusting the image quality of the 3D image to enhance brightness of the 3D image according to information on the transmissivity of the light which passes through the 3D glasses.

4. The method as claimed in claim 2, wherein the adjusting comprises adjusting the image quality of the 3D image to enhance a contrast ratio of the 3D image according to information on the contrast change rate of the image which passes through the 3D glasses.

5. The method as claimed in claim 2, wherein the adjusting comprises adjusting a color hue of the 3D image to a complementary color of a color hue, which is changed when passing through the 3D glasses according to information on the color hue change rate of the image passing through the 3D glasses, to adjust the image quality of the 3D image.

6. The method as claimed in claim 1, wherein the attribute information of the 3D glasses is received from the 3D glasses.

7. The method as claimed in claim 6, wherein the acquiring comprises, if a determination is made that a viewer has worn the 3D glasses, acquiring the attribute information of the 3D glasses from the 3D glasses.

8. The method as claimed in claim 1, wherein the acquiring comprises, if a determination is made that the attribute information of the 3D glasses has been modified when playing the 3D image, acquiring the attribute information of the 3D glasses from the 3D glasses.

9. A 3D display apparatus which is connected to 3D glasses to display a 3D image, the 3D display apparatus comprising:

a communicator which communicates with an external device to receive attribute information of the 3D glasses; and
a controller which adjusts an image quality of the 3D image to be displayed according to the attribute information of the 3D glasses acquired from the external device for display on a display unit,
wherein the attribute information includes information on optical characteristics of the 3D glasses.

10. The 3D display apparatus as claimed in claim 9, wherein the attribute information of the 3D glasses comprises at least one of transmissivity of light which passes through the 3D glasses, a contrast change rate of an image which passes through the 3D glasses, a color hue change rate of the image, a clarity change rate of the image, information on a type of the 3D glasses, and information on a manufacturing company of the 3D glasses.

11. The 3D display apparatus as claimed in claim 10, wherein the controller adjusts the image quality of the 3D image to enhance brightness of the 3D image according to information on the transmissivity of the light which passes through the 3D glasses, wherein the information is acquired from the communicator.

12. The 3D display apparatus as claimed in claim 10, wherein the controller adjusts the image quality of the 3D image to enhance a contrast ratio of the 3D image according to information on the contrast change rate of the image which passes through the 3D glasses, wherein the information is acquired from the communicator.

13. The 3D display apparatus as claimed in claim 10, wherein the controller adjusts a color hue of the 3D image to a complementary color of a color hue, which is changed when passing through the 3D glasses, according to information on the color hue change rate of the image passing through the 3D glasses, to adjust the image quality of the 3D image, wherein the information is acquired from the communicator.

14. The 3D display apparatus as claimed in claim 9, wherein the communicator receives the attribute information of the 3D glasses from the 3D glasses.

15. The 3D display apparatus as claimed in claim 14, wherein if a determination is made that a viewer has worn the 3D glasses, the communicator receives the attribute information of the 3D glasses from the 3D glasses.

16. The 3D display apparatus as claimed in claim 9, wherein if a determination is made that the attribute information of the 3D glasses has been modified when playing the 3D image, the communicator receives the attribute information of the 3D glasses from the 3D glasses.

17. A method for adjusting an image quality of a 3D image of a 3D display apparatus which is connected to 3D glasses and an external player to display the 3D image, the method comprising:
　acquiring attribute information of the 3D glasses;
　transmitting the attribute information of the 3D glasses to the external player;
　receiving the 3D image of which image quality has been adjusted according to the attribute information of the 3D glasses; and
　displaying the 3D image of which image quality has been adjusted,
　wherein the attribute information includes information on optical characteristics of the 3D glasses.

18. The method as claimed in claim 17, wherein the attribute information of the 3D glasses is transmitted using one of a high definition multimedia interface display data channel (HDMI DDC) communication, a HDMI consumer electronics control (CEC) communication, and an Ethernet communication.

19. The method as claimed in claim 18, wherein if the HDMI DDC communication is used, the attribute information of the 3D glasses is stored in extended display identification data (EDID) information and then transmitted.

20. A 3D display apparatus which is connected to 3D glasses and an external player to display a 3D image, the 3D display apparatus comprising:
　a first communicator which communicates with the 3D glasses;
　a second communicator which communicates with the external player; and
　a controller which transmits the attribute information of the 3D glasses, which is acquired from the first communicator, to the external player and receives the 3D image of which image quality has been adjusted according to the attribute information of the 3D glasses, from the external player to display the 3D image of which image quality has been adjusted on a display unit,
　wherein the attribute information includes information on optical characteristics of the 3D glasses.

21. The 3D display apparatus as claimed in claim 20, wherein the second communicator communicates with the external player using one of a HDMI DDC communication, a HDMI CEC communication, and an Ethernet communication.

22. The 3D display apparatus as claimed in claim 21, wherein if the HDMI DDC communicator is used, the second communicator stores and transmits the attribute information of the 3D glasses in EDID information.

23. 3D glasses which are connected to a 3D display apparatus to view a 3D image, the 3D glasses comprising:
　a 3D glasses communicator which communicates with the 3D display apparatus;
　a storage unit which stores attribute information of the 3D glasses; and
　a controller which transmits the attribute information of the 3D glasses to the 3D display apparatus,
　wherein the attribute information includes information on optical characteristics of the 3D glasses.

24. The 3D glasses as claimed in claim 23, wherein the attribute information of the 3D glasses comprises at least one of transmissivity of light which passes through the 3D glasses, a contrast change rate of an image which passes through the 3D glasses, a color hue change rate of the image, a clarity change rate of the image, information on a type of the 3D glasses, and information on a manufacturing company of the 3D glasses.

25. The 3D glasses as claimed in claim 23, wherein if a determination is made that a viewer has worn the 3D glasses, the controller transmits the attribute information of the 3D glasses to the 3D display apparatus.

26. The 3D glasses as claimed in claim 23, wherein if a determination is made that the attribute information of the 3D glasses has been modified when playing the 3D image, the controller transmits the attribute information of the 3D glasses to the 3D display apparatus.

27. A system for providing a 3D image, the system comprising:
　3D glasses which store attribute information of the 3D glasses and transmit the attribute information of the 3D glasses to the 3D display apparatus; and
　a 3D display apparatus which receives the attribute information of the 3D glasses to automatically adjust an image quality of the 3D image according to the attribute information of the 3D glasses,
　wherein the attribute information includes information on optical characteristics of the 3D glasses.

* * * * *